H. PASSOW.
APPARATUS FOR PRODUCING CEMENT.
APPLICATION FILED JULY 1, 1907.
964,805.
Patented July 19, 1910.
2 SHEETS—SHEET 1.
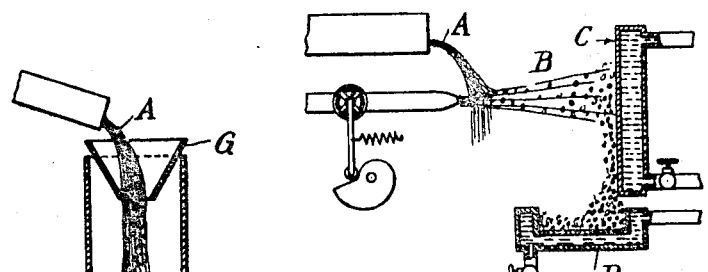
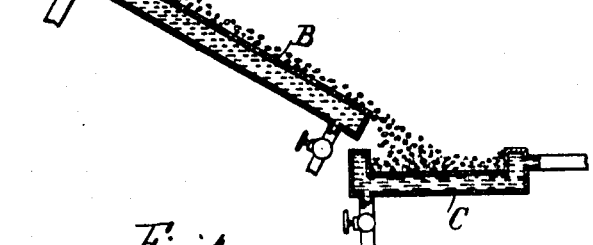
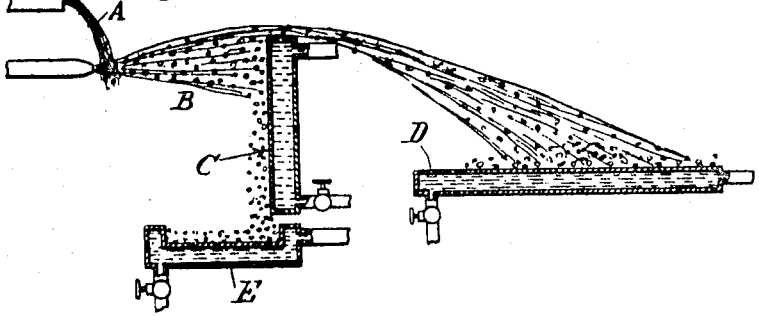
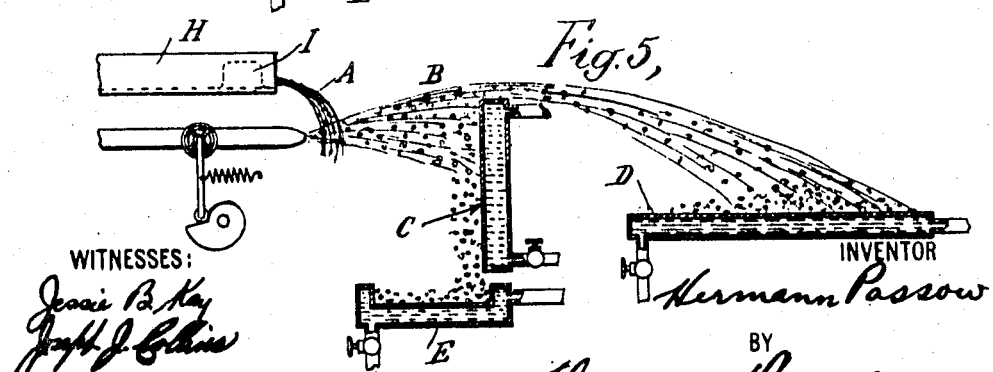

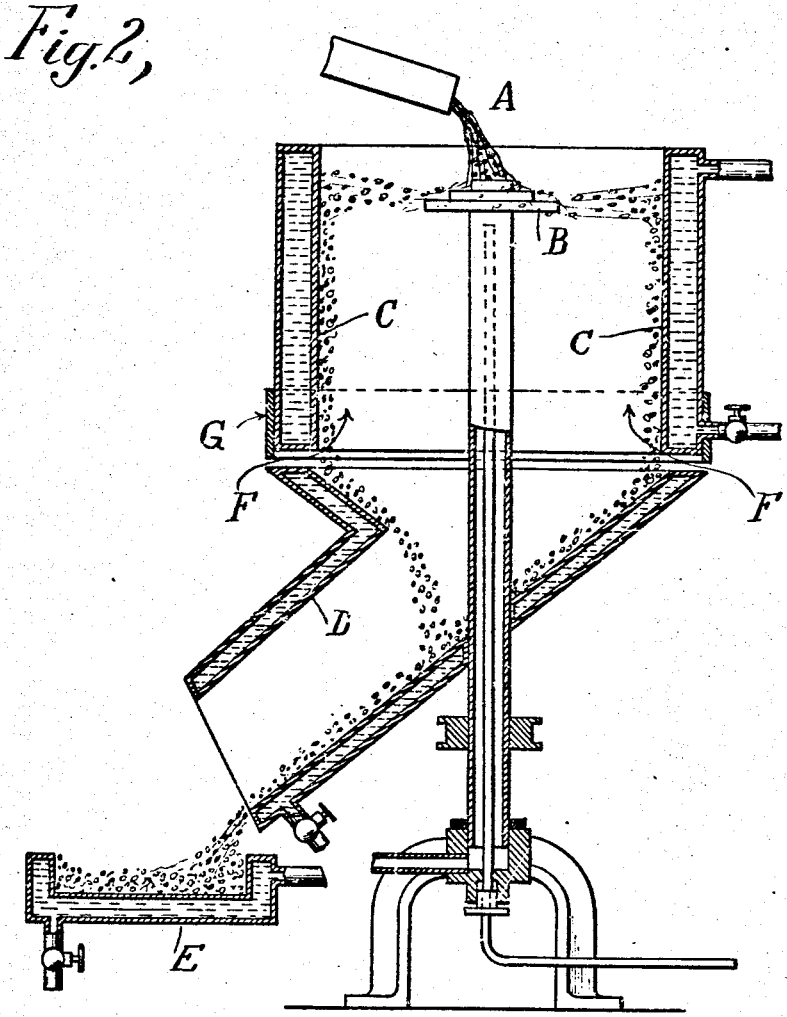

UNITED STATES PATENT OFFICE.

HERMANN PASSOW, OF BLANKANESE, GERMANY, ASSIGNOR, BY MESNE ASSIGNMENTS, TO THE ATLAS PORTLAND CEMENT COMPANY, OF NEW YORK, N. Y., A CORPORATION OF PENNSYLVANIA.

APPARATUS FOR PRODUCING CEMENT.

964,805.         Specification of Letters Patent.     Patented July 19, 1910.

Application filed July 1, 1907. Serial No. 381,581.

*To all whom it may concern:*

Be it known that I, HERMANN PASSOW, chemist, a subject of the German Emperor, now residing at Blankanese, Germany, have made a certain new and useful Invention Relating to Apparatus for Producing Cement, of which the following is a specification, taken in connection with the accompanying drawings, forming part of this application, which is a divisional continuation of my copending application, Serial No. 138,060, filed January 6, 1903—that is, consists, substantially, of divisional subject-matter taken therefrom.

This invention relates to improvements in the treatment of blast furnace slags, or other slags, made from artificially melted materials, of a similar kind, and relates especially to the production of granulated or pulverized slags in defined chemical or physical conditions necessary for the production of cements, in accordance with my invention described in prior Letters Patent granted to me.

In order to carry out the invention referred to in the hereinbefore mentioned specification, I have described means of selecting by chemical tests set out therein, the different classes of slags necessary, and dividing such slags into two classes, which are chemically active and chemically inert, under such tests.

This invention relates to the treatment of slag or the like so as to produce at will, positively and certainly, from a single stream of slag, the two required varieties in a predetermined manner, or to produce a mixture of the two in suitable proportions.

For the purpose of granulating or disintegrating the slag, I may use any of the known methods, by a blast of steam, or air, or gas, or by mechanical means, such as rollers, or centrifugal dispersers, or by allowing the slag to fall through a space, being broken up in its fall, and sufficiently cooled to prevent its aggregation after falling. In the case of a blast of steam or preferably of air, or of gas, or a mixture of steam and air or gas, I regulate the force of the blast, so as to produce particles of larger or smaller size, so that for the same temperature of the air they cool at a determined rate, depending on the size, and in some cases I arrange for the particles to be projected onto or against a cooling surface, the temperature of which I regulate by means of water or air cooling, so that the cooling effect on the pulverized particles is controlled. I also in certain cases regulate the temperature of the steam or air blast. By all this I arrange a fractional cooling by different stages and degrees. In the case of mechanical disintegrators, I use the following methods of regulating, viz:—by regulating the temperature of the surface on which the slag first falls, and of the moving or disintegrating part of the machine, by cooling them more or less by means of air or water, and I further modify the condition of the disintegrated slag by regulating the temperature of the air through which the slag is projected, also by the speed at which it is projected as well as by the size of the disintegrated particles, and further, I regulate the final cooling, by the temperature of the surface onto which the disintegrated particles fall. By these means complete control is given of the chemical and physical condition of the disintegrated slag, so as to produce the varieties required for my process of making cement, so that in one apparatus or set of apparatus, the different varieties may be produced ready for mixing.

I now proceed to define the conditions under which by such controlling elements of the apparatus the required states of chemical activity of the slags may be obtained. In order to produce the chemically inert variety of slag, the disintegrating element by blast or mechanical or gravitational means, must be regulated so as to break the molten slag as far as possible into spherical particles, or thin sheets and to cool it as rapidly as possible below a visible heat, without using any water directly in contact. A glassy product is thus produced, which has the property, when ground and mixed with water, of giving little or no rise of temperature when heated with carbonic acid gas, being what I have referred to, as chemically inert. In order to produce the chemically active variety of slag, the disintegrating element by blast or mechanical or gravitational means, must be regulated as for the former variety, but better results may be obtained by adjusting the pulverizing element so as to break the slag as far as possible into irregular spongy, blistered, friable masses or particles, and the slag must be cooled as quickly as possible, to such a state that it is of about plastic consistency, and from this state the cooling must be continued at a slower rate than for the first mentioned variety, till below a visible temperature. In some cases it is advisable to use with the steam or air blast, either with or without mechanical apparatus or other disintegrators, a certain quantity of water, which however will not be sufficient to wet the product, but only assists by its sudden conversion into gas, the formation of the desired spongy structure. The slag so heated is of a nonglassy and pumiceous structure, and when ground and mixed with water, shows a considerable rise of temperature when heated with carbonic acid gas.

Although I prefer to make the two separate products necessary for my process of making cement at different operations, because thereby, their mixing can be better regulated, in certain cases it is convenient to adjust the disintegration so that a mixture of the two sorts is produced. To effect this, an element of inequality must be introduced, so that the size and structure of the particles produced, may vary, that is with steam or air blasts, the stream of slag must be somewhat irregular in quantity, or rate of flow, or the blast must be of a pulsating nature, and in the case of mechanical disintegrators, the stream of the slag may fall in an irregular manner, upon the moving surface, and may be thrown unequally to different distances, or at different velocities, and in the case of gravitational disintegrators, must pass over the weir or dam face at a varying or irregular rate, sufficient variations in all these cases may usually be obtained by some obstruction to the flow from the source of the slag, so that a surging action is set up in the stream giving it a sufficiently pulsating character, but positive means may be adapted for achieving this kind of irregularity. For this purpose the apparatus will be regulated intentionally to critical points, where the particles are subjected to different treatment resulting in variation in size, form and structure, the cooling and transformation being above and below a mean point, by which, both glassy and non-glassy slags are produced at the same time in suitable proportions. Another way of achieving the same result is to let one part of the disintegrated slags fall on a surface of one temperature, and part on a surface at another temperature, so that the secondary cooling is at different rates, or to allow one part of the slags to be conveyed away over cooling surfaces, in a thin layer, while other parts are massed together, and so retain the heat and the secondary cooling is retarded. Or, where the slag particles are projected through the air, I arrest one part of the stream by a cooling surface, at the point where the particles have reached a solid or plastic condition, and I allow the other part to continue passing through the air, till cooled down. Other ways of achieving the results intended are illustrated in the processes and apparatus referred to in the following paragraphs:

1. A process of treatment of slag or similar molten materials, for the purpose of producing a material for the direct manufacture of cement, consisting of disintegrating the material in a molten state, the cooling of the particles as nearly instantaneously as possible from the fluid condition to a solid or plastic condition, and the subsequent cooling of the said particles at a slow rate to a temperature below a visible heat so as to produce a chemically active material.

2. A process of treatment of slag or similar molten materials, consisting of disintegrating the material in a molten state, so that the particles are cooled as nearly instantaneously as possible from the fluid condition to a solid or plastic condition, one part of such material being then further cooled as rapidly as possible to a temperature below a visible heat being then chemically inert, the other part of such material being allowed to cool slowly to a temperature below a visible heat being then chemically active, for the purpose of producing together two materials for the direct manufacture of cement.

3. Apparatus for carrying out the processes described in paragraphs 1 and 2, consisting of a pulverizing element capable of being regulated so as to produce particles of defined character and a cooling medium or mediums capable of being regulated as to temperature for the purpose of producing chemically inert and active slags at will, substantially as described.

4. Apparatus for carrying out the process described in paragraphs 1 and 2, consisting of a steam or steam and air or gas blast capable of being regulated as to pressure or quantity, or with means of regulating the temperature of the air through which the particles are projected and receptive cooling surfaces capable of being regulated as to temperature, for the purpose of producing chemically inert and active slags at will, substantially as described.

5. Apparatus for carrying out the process described in paragraphs 1 and 2, consisting of a mechanical disintegrator or disperser, capable of being regulated as to speed, means for regulating the temperature of the air through which the particles are projected and receptive cooling surfaces capable of being regulated as to temperature for the purpose of producing chemically inert and active slags at will, substantially as described.

6. Apparatus for carrying out the process described in paragraphs 1 and 2, consisting of a pulverizing element, capable of being regulated so as to produce particles of defined character, a cooling medium or mediums capable of being regulated as to temperature and a source of supply of water acting on the still fluid slag so that without permanently wetting it, it acts to open up the structure in the slag particles for the purpose of producing chemically active slag, substantially as described.

7. Apparatus for carrying out the process described in paragraphs 1 and 2, consisting of the elements described in paragraphs 3 to 6, in combination with means for producing an unequal disintegration and cooling of the slag so that all the other elements being regulated to a fixed condition both chemically inert and active slags are produced together, substantially as described.

8. Apparatus for carrying out the process described in paragraphs 1 and 2 consisting of the elements described in paragraphs 3 to 6, in combination with means for arresting one part of the projected particles by a surface capable of being controlled as to temperature, and such particles falling on a receiving surface capable of being controlled as to temperature with means for receiving and collecting when further cooled the other part of the projected particles, substantially as described.

Having now described the nature of my invention, I proceed to illustrate by diagrams the methods of carrying out the same.

Figure 1 shows A, a stream of slag which in falling is met by a jet of steam or air or gas B, and pulverized and thrown against the water cooled surface C, falling into a water cooled conveyer D, only the conveyer trough or chute being shown, the moving conveyer elements being omitted to avoid confusion. By the regulation of the force of the jet B, the temperature of C and the temperature of D the size of the particles and their rate of cooling is determined.

Fig. 2 shows a stream of slag A, falling on to a mechanical disintegrator B, a water cooled revolving spindle throwing the pulverized slag against the water cooled walls C whence they fall down the water cooled chute D into the water cooled conveyer E. By regulating the temperature of these surfaces, as well as the velocity of the cone B, and the temperature of the air entering at F, by adjusting the sleeve G, the required regulation of the cooling is effected. In certain cases the revolving spindle B may be supplied with air which issues from a series of holes in the cone B and may be supplied with water in small quantities to assist by its sudden conversion into steam, the production of the required structure of the slag.

Fig. 3 shows at A, a stream of slag falling over a weir and having sufficient height to be partially cooled in falling, and falling on a water cooled surface B and into a water cooled conveyer C, by the regulation of the temperature of these elements, and of the air passing through F by adjusting the cone G the necessary regulation of the cooling may be obtained.

Fig. 4 shows an arrangement where one part of the slag is arrested by a cooling surface and the other part is allowed to continue passing through the air till cooled down. A is the slag stream, B is a jet of steam or air or gas or a mixture of them, or other pulverizing device. C is a cooling surface arresting part of the projected particles, which fall on the water cooled conveyer E. D is a cooling surface receiving the other part of the projected particles.

Fig. 5 shows a similar arrangement and illustrates diagrammatically an obstruction I in the slag spout H so that a surging action is set up in the slag stream A to more readily produce the two separate products simultaneously as has been described.

In the case of Fig. 1 the two sorts of slags, that is, active and inactive, may be produced at the same time when the stream of slag A is of a variable or surging nature, or the blast B may by means of a motion given mechanically to the valve regulating it, be made to vary in its force as shown in a valve operating lever and cam in Fig. 1, and by these means particles of varying size are produced which cool at different rates, or the surface C may be placed horizontally, so that the particles travel a different distance, and lie on the surface in layers of different thickness to cool. In the case of mechanical disintegrators of the class shown in Fig. 2, the same irregularity of the flow may be used to produce a difference in the size of the particles, or the stream instead of falling centrally on the cone B, may fall partly centrally, and partly on a radial line, so that the slags meet surfaces traveling at different velocities and so are thrown at different speeds through the air onto the cooled walls, and finally reach the conveyer in different states of cooling. In the case of gravitational coolers of the type shown in Fig. 3, a variable or surging flow of slag will produce the same results so as to give different sized, and differently cooled, slags, falling on the cooling surface B.

It will be understood that I do not confine myself to the particular arrangements shown in Figs. 1, 2, 3, which are merely descriptive each of a class of apparatus by which I carry out the cooling of slags in the particular manner necessary for my invention.

It will be understood by those familiar with this art that many modifications may be made in the form, size, proportions and numbers of parts of this apparatus. Further parts of this apparatus may be used without employing the whole and parts may be used in connection with other devices without departing from the spirit of this invention or losing the advantages of the same. I do not, therefore, desire to be limited to the details of the disclosure which has been made in this case, but

What I claim as new and desire to secure by Letters Patent is set forth in the appended claims.

1. In cement apparatus, means to produce a pulsating stream of highly heated furnace slag and means to diversely cool said slag to produce active and inert cement material.

2. In cement apparatus, means to produce a pulsating stream of furnace slag and means to disintegrate and cool said slag to produce active and inert cement material.

3. In cement apparatus, means to produce a pulsating stream of furnace slag and means to disintegrate said slag into particles and project the same through a fluid medium to produce active and inert cement material.

4. In cement apparatus, means to produce a pulsating stream of furnace slag, means to disintegrate said slag into particles and project the same through a fluid medium and means to cool said slag to produce active and inert cement material.

5. In cement apparatus, means to produce a pulsating stream of furnace slag, means comprising fluid jets to disintegrate said slag into particles and project the same through a fluid medium and means to cool said slag to produce active and inert cement material.

6. In cement apparatus, means to produce a pulsating stream of furnace slag and means comprising a fluid jet to disintegrate said slag into particles and project the same through a fluid medium to produce active and inert cement material.

7. In cement apparatus, means to produce a pulsating stream of highly heated furnace slag and means comprising a fluid jet to diversely cool said slag to produce active and inert cement material.

8. In cement apparatus, means to produce an irregular stream of furnace slag and means comprising a fluid jet to disintegrate and cool said slag to produce active and inert cement material.

9. In cement apparatus, means to produce an irregular stream of furnace slag and means to diversely cool said slag to produce active and inert cement material.

10. In cement apparatus, means to produce a pulsating stream of furnace slag and means to disintegrate and cool said slag to produce cement material.

11. In cement apparatus, means to produce an irregular stream of furnace slag and means to disintegrate and cool said slag to produce cement material comprising active cement material.

12. In cement apparatus, means to produce a pulsating stream of furnace slag, means to disintegrate said slag into particles and project the same through a fluid medium and an impinging surface to intercept part of said particles.

13. In cement apparatus, means to produce a pulsating stream of highly heated furnace slag, means to disintegrate said slag into particles and an impinging surface to intercept part of said particles.

14. In cement apparatus, means to produce an irregular stream of highly heated furnace slag, means to disintegrate said slag into particles and project the same through a fluid medium, an impinging surface to intercept part of said particles and a surface beyond said impinging surface to receive the particles not intercepted thereby.

15. In cement apparatus, means to produce an irregular stream of highly heated furnace slag, means to disintegrate said slag into particles and an impinging surface to intercept part of said particles.

16. In cement apparatus, means to produce an irregular stream of highly heated furnace slag and means comprising a cooled impinging surface to cool said particles.

17. In cement apparatus, means to produce an irregular stream of highly heated slag particles and means comprising an impinging surface to diversely cool said particles.

18. In cement apparatus, means to produce an irregular stream of heated slag particles and a cooled impinging surface to partly intercept said particles.

19. In cement apparatus, means to produce a pulsating stream of heated slag particles, an impinging surface to partly intercept said slag particles and means to receive the slag particles not intercepted by said surface.

20. In cement apparatus, means to produce a pulsating stream of slag particles and means to receive and cool said particles to produce active cement material.

21. In cement apparatus, means to produce a pulsating stream of furnace slag and means to disintegrate and project said slag through a fluid medium.

22. In cement apparatus, means to produce an irregular stream of furnace slag, means to disintegrate said slag into particles and project the same through a fluid medium and means comprising an impinging surface to cool said particles.

HERMANN PASSOW.

Witnesses:
WILHELM SCHEID,
OTTO W. HELLMRICH.